United States Patent [19]

Shababy et al.

[11] Patent Number: 5,308,716
[45] Date of Patent: May 3, 1994

[54] BATTERY PACK RETENTION APPARATUS

[75] Inventors: Michael L. Shababy, Stone Park; Timothy P. McCormick, Gurnee, both of Ill.

[73] Assignee: Motorola, Inc., Schaumburg, Ill.

[21] Appl. No.: 123,815

[22] Filed: Sep. 20, 1993

[51] Int. Cl.⁵ .............................................. H01M 2/10
[52] U.S. Cl. .................................. 429/97; 429/100; 429/123
[58] Field of Search ................... 429/96–100, 429/121, 123; 455/347, 348; 379/441, 447; 439/500, 504

[56] References Cited

U.S. PATENT DOCUMENTS 4,904,549  2/1990  Goodwin et al. ............... 429/97

*Primary Examiner*—Anthony Skapars
*Attorney, Agent, or Firm*—Kirk W. Dailey; Rolland R. Hackbart; F. John Motsinger

[57] ABSTRACT

The battery pack retention apparatus, described herein, is an injection molded part. The injection molded part includes a rear housing (200) for a radiotelephone (100), two rails (201, 203) for a battery pack (101) to slide along and six guide bars (207, 209, 211, 213, 215, 217) for retaining the battery pack (101) on the radiotelephone (100). Four of the six guide bars are the compliance-type. The compliance-type guide bars (207, 211, 213, 217) have a U-shape and are coupled to the rails. A channel (401) is cored out from the rails under the compliance-type guide bars to allow for deflection of the guide bars. Deflection is caused by the bullets (409) of the battery pack (101) when the battery pack (101) is fully inserted. The deflection(y) of the guide bars provides a calculated force upon the battery pack (101). This calculated force ensures a high quality electrical connection between the contacts of the battery pack and the contacts of the radiotelephone.

12 Claims, 3 Drawing Sheets

BATTERY PACK RETENTION APPARATUS

FIELD OF THE INVENTION

The invention generally relates to battery packs and more specifically to apparatus for retaining a battery pack on a housing containing a battery operated device.

BACKGROUND OF THE INVENTION

In the field of portable electronic devices, there is a need to readily remove and securely reattach battery packs to portable battery operated devices. When the battery packs are attached to the portable battery operated devices, it is necessary to make positive electrical connections between the battery pack and the battery operated device such that the battery pack may provide a constant supply of power to the portable battery operated device.

Previously, there were many devices that provided a simple attachment and removal of a battery pack between portable battery operated device, however, some of the battery packs and portable battery operated devices retention mechanisms failed when subjected to a harsh environment. Thus, it would be advantageous to create a battery pack retention apparatus that provided a more secure retention of the battery pack and consequently a higher quality of electrical connection between the battery pack and the portable battery operated device.

DESCRIPTION OF A PREFERRED EMBODIMENT

Generally, the battery pack retention apparatus, described herein, is an injection molded part. The injection molded part includes a rear housing for a radiotelephone, two rails for a battery pack to slide along and six guide bars for retaining the battery pack on the radiotelephone. Four of the six guide bars are compliance-type guide bars. The compliance-type guide bars have a U-shape and are coupled to the rails. A channel is cored out from the rails under the compliance-type guide bars to allow for deflection of the guide bars. Deflection of the compliance-type guide bars is caused by the bullets of the battery pack when the battery pack is fully inserted. The deflection provides a calculated force upon the battery pack. This calculated force ensures a high quality electrical connection between electrical contacts on the battery pack and electrical contacts on the radiotelephone.

Figure 1:
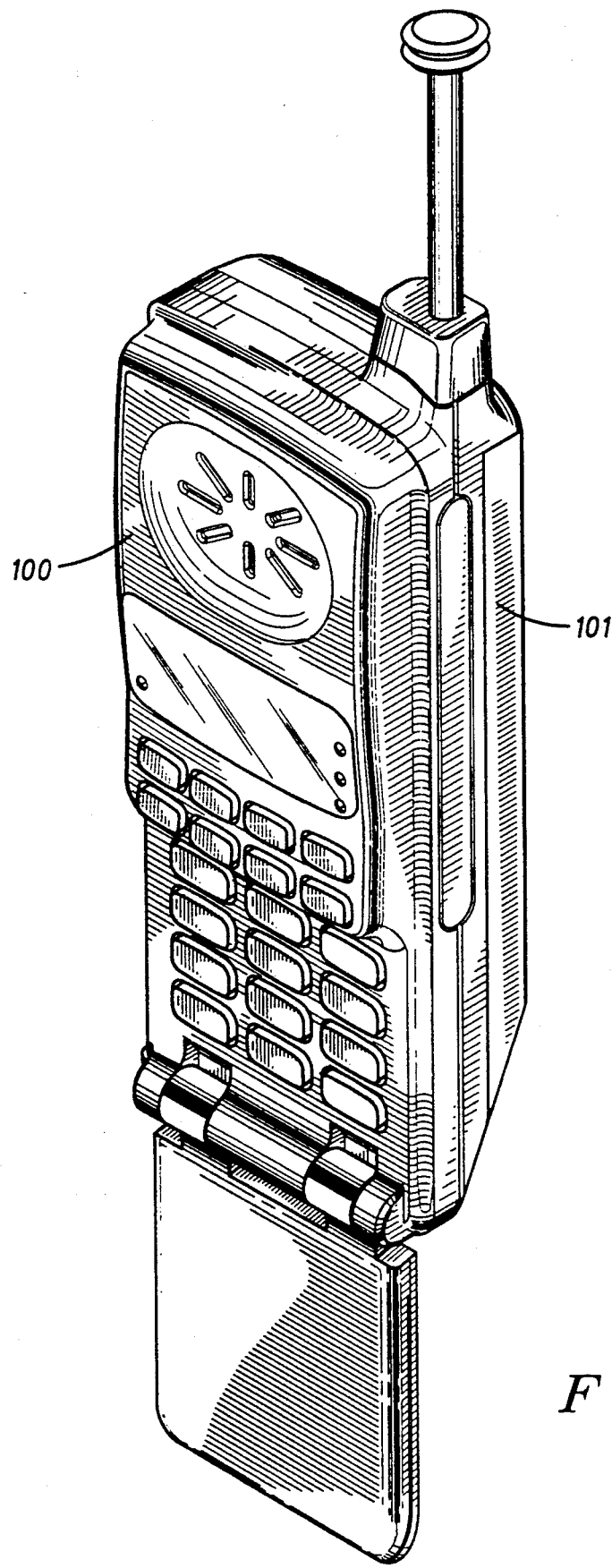
FIG. 1 is an illustration of a portable radiotelephone that may employ the present invention.

FIG. 1 is an illustration of a portable radiotelephone 100 with a detachable battery pack 101 attached. The portable radiotelephone 100 is one of many portable battery powered electrical devices that are in use today, others include lap top computers, pagers and flashlights.

Figure 2:
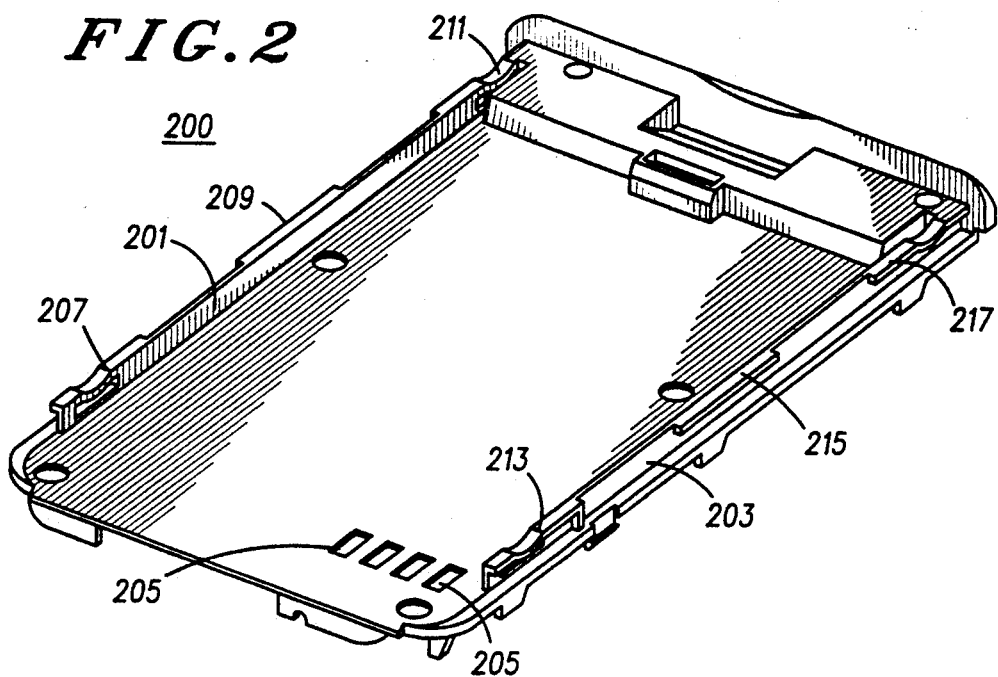
FIG. 2 is an illustration of a housing of a portable radiotelephone, such as the one illustrated in FIG. 1, employing the present invention.

FIG. 2 is an illustration of the rear housing 200 of the portable radiotelephone 100 that employs the present invention. In the preferred embodiment, the rear housing 200 has two rails 201, 203 aligned parallel to each other and lengthwise along the back side of the rear housing 200. Each of the rails 201, 203 include at least one compliance guide bar for exerting pressure on the battery pack 101 when it is fully inserted. In the preferred embodiment, the first rail 201 contains three guide bars 207, 209, 211. Guide bars 207 and 211 are of the compliance-type which are the subject of the present invention. The second rail 203 likewise contains three guide bars 213, 215, 217. Guide bars 213 and 217 are of the compliance-type as well. Other equally sufficient embodiments may contain a different number of rails and a different number of compliance guide bars as deemed necessary for the requirements of the particular embodiment.

The openings 205 in the rear housing 200 allow access to a first set of electrical contacts coupled to the electrical components contained within the portable radiotelephone housing when the radiotelephone is fully assembled. When the radiotelephone 100 is fully assembled, the first set of electrical contacts project out of the rear side of the housing 200 through the opening 205. Each of the electrical contacts exerts a force upon the battery pack 101 when it is fully inserted. To overcome this force, the compliance guide bars are designed to provide a force that exceeds the force provided by the electrical contacts and the force caused by the weight of the battery pack 101 itself The calculations used in designing the compliance guide bars of the preferred embodiment are illustrated below.

Figure 3:
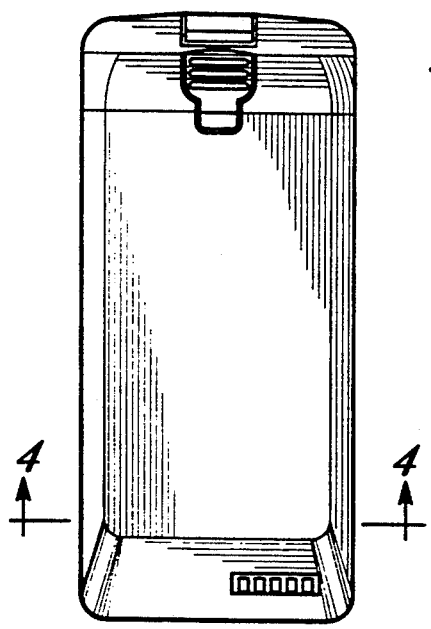
FIG. 3 is a rear illustration of a portable radiotelephone and a battery pack attached which employ the present invention.
Figure 4:
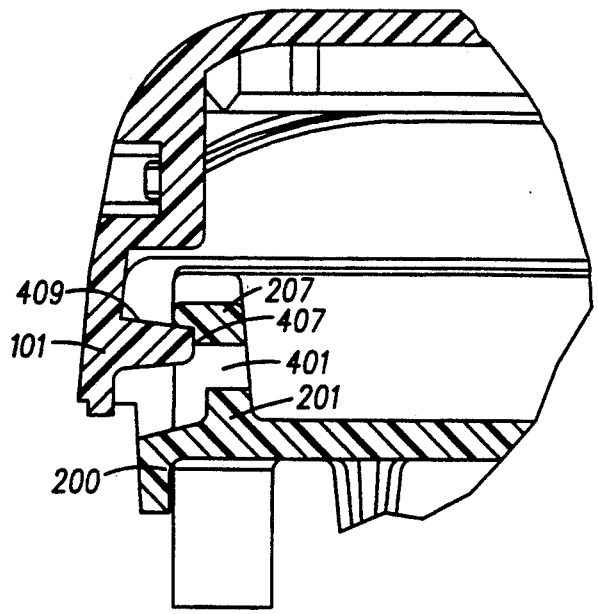
FIG. 4 is an cross-sectional view of the interface between the battery pack and the rear housing of the portable radiotelephone illustrated in FIG. 3.

FIG. 3 is an illustration depicting the rear plan view of the portable radiotelephone 100 with the battery pack 101 attached. FIG. 4 is a cross-sectional view of Section A—A indicated in FIG. 3. FIG. 4 enhances the illustration of the interface between the battery pack 101 and the rear housing 200 of the portable radiotelephone 100. From the section A—A illustrated in FIG. 4, one can clearly see the rail 201 rising from the rear housing 200. The area indicated by reference number 401 is a channel spacing that allows the compliance guide bar 207 to be deflected away from the rear housing at the forced interference point 407. The forced interference point 407 is caused by the compliance guide bar 207 and the bullet 409 of the battery pack's housing.

Figure 5:
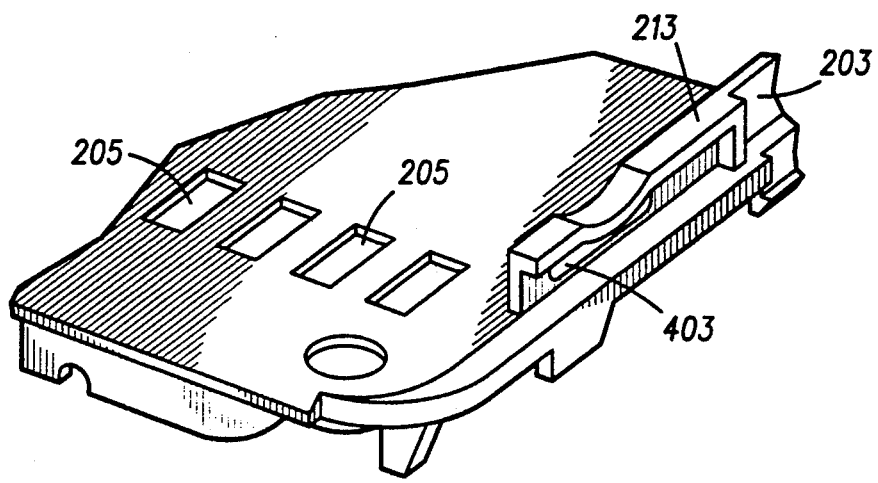
FIG. 5 is a magnified view illustrating a portion of the rear housing of the portable radiotelephone employing the present invention.

FIG. 5 is a magnified view illustrating a portion of the rear housing 200 of the portable radiotelephone 100 that employs the present invention. This view is a clear illustration of the rear housing 200 that includes the channel 403 in the rail 203 and the compliance guide bar 213. The openings 205 in the rear housing 200 as stated earlier, allow access to the first set of electrical contacts that are coupled to the electrical components contained within the portable radiotelephone 100. This first set of electrical contacts exert a force upon the battery pack 101 when it is fully inserted. In the preferred embodiment, there are four electrical contacts in the first set of electrical contacts. Each of the four contacts exert 50 grams of force resulting in a 200 gram force against the battery pack 101 of which the battery pack 101 must provide at least an equal and opposite force to insure a reliable connection between a first and a second set of electrical contacts.

Figure 6:
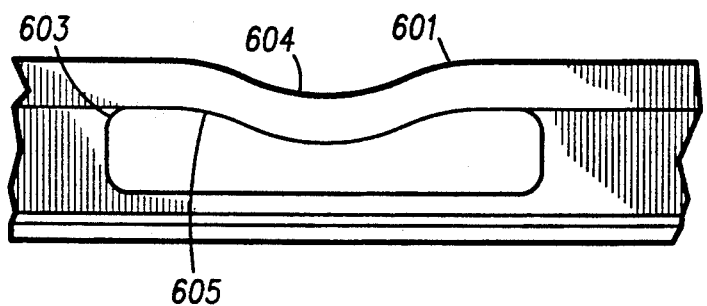
FIG. 6 is a right side elevation view of a portion of the rear housing of a portable radiotelephone employing the present invention.

FIG. 6 is a right side elevational view illustrating, in detail, the rail 203 and the compliance guide bar 213. Together, the four compliance guide bars 207, 211, 213, 217 provide a force exceeding the force created by the weight of the heaviest possible battery pack and the force of the first set of electrical contacts. When the battery pack 101 is inserted into the battery pack retention apparatus of the radiotelephone 100, the battery pack 101 is slid along the set of rails 201, 203. A portion of the battery pack 101, namely the bullet 409 illustrated in FIG. 4, slides along the underside of the six guide bars present in the preferred embodiment 207, 209, 211, 213, 215, 217. As the battery pack 101 slides along the set of rails 201, 203, the bullets 409 come into contact with the U-shaped portion of the compliance guide bars. The U-shaped portion of the compliance guide bars deflects upwards and away from the rear housing 200. This deflection produces a load or force upon the bullets of the battery pack 101, drawing the battery pack 101 to the rear housing 200 of the portable radiotelephone 100. By consciously designing the compliance guide bars 207, 211, 213, 217 to apply a predetermined force, one can insure that the battery pack 101 will maintain sufficient force upon the first set of electrical contacts, resulting in a high quality electrical connection.

A specific calculation involved in determining the shape, material, base and height of the compliance guide bars 207, 211, 213, 217 and their respective channels and rail are shown below. The radii 601, 603, 605 are incorporated throughout the design to reduce stress and concentrators of force and to increase the flexibility and longevity of the compliance guide bars and the corresponding rails. The exact shape of the radii 601, 603, 605 are not of concern of the present invention, however, someone of sufficient capability in the art would be able to incorporate these radii.

Figure 7:
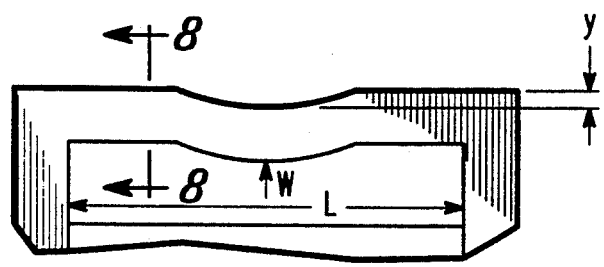
FIG. 7 is an illustration of the theoretical beam used for calculations pertinent to the present invention
Figure 8:
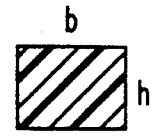
FIG. 8 is an illustration of a sectional view of the theoretical beam illustrated in FIG. 7.

FIG. 7 is a model of a theoretical fixed end beam which was used to calculate the U-shape 607 of FIG. 6. FIG. 8 is an illustration of cross Section B-B as indicated in FIG. 7, indicating the base (b) and height (h) dimensions of the beam.

W is the amount of force required to be made by the compliance guide bars. In the preferred embodiment, W is calculated by assuming the compliance guide bars must provide at least enough force to hold the heaviest battery pack (190 g) plus a force equal to the force applied to the battery pack by the first set of electrical contacts (200 g).

$$W = 190 \text{ g} + 4 (50 \text{ g}) = 390 \text{ g}$$

390 g is the total weight that the battery pack retention apparatus must support. Since there are 4 compliance guide bars, each compliance guide bar provides ¼ of the total force required.

$$W_{bar} = 390 \text{ g}/4 = 97.5 \text{ g} = 0.0975 \text{ Kg}$$

Now converting the mass to force reveals $$M \times a = F$$

$$0.0975 \times 9.81 = 0.956 \text{ Newton}$$

Using the equations for the deflection, y, the moment of inertia, I, and the maximum stress of the material, $\sigma_{MAX}$, one can solve for the unknown values b and h.

$$y = \frac{WL^3}{192EI},$$

$$I = \frac{bh^3}{12}, \text{ and}$$

$$\sigma_{MAX} = \frac{3}{4} \frac{WL}{bh^2}$$

In calculating the dimensions of the compliance guide bars 207, 211, 213, 217 the following assumptions were made:
1. y=the amount of desirable deflection 0.5 mm
2. smax=maximum stress of material 40 N/mm$^2$
3. L=13 nim
4. W=0.956 N
5. a=acceleration of gravity=9.81 m/seconds$^2$
6. E. Young's modulus=1900 N/mm$^2$ resulting in the following equations for b and h:

$$b = \frac{WL^3}{16Eh^3y} = \frac{(0.956)(13)^3}{16(1900)(0.59)^3(0.5)} = 0.67 \text{ mm}$$

$$h = \frac{\sigma_{MAX}L^2}{12Ey} = \frac{40(13)^2}{12(1900)(0.5)} = 0.59 \text{ mm}$$

What is claimed is:

1. A battery pack retaining device formed integrally with a first planar side of a housing of an electrical device and accepting a battery pack, said battery pack retaining device comprising:
   a first rail coupled to the first planar side and having at least a first channel formed therein along a first portion of the first rail, the first channel being perpendicular to the first planar side; and
   at least a first compliance guide bar integrally coupled to the first portion of the first rail and forming a top side of said first channel, the at least first compliance guide bar having a shape such that upon full insertion of the battery pack the guide bar is deflecting away from the first planar side by the battery pack and exerting a first predetermined force on the battery pack towards the first planar side.

2. A battery pack retaining device in accordance with claim 1 further comprising:
   a second rail coupled to the first planar side and aligned parallel to said first rail, the second rail having at least a second channel formed therein along a second portion of the second rail, the second channel also perpendicular to the first planar side; and
   at least a second compliance guide bar integrally coupled to the second portion of the second rail and forming a top side of said second channel, the at least second compliance guide bar having the shape of the at least first compliance guide bar.

3. A battery pack retaining device in accordance with claim 1 wherein the shape of the at least first compliance guide bar is a U-shape wherein the apex of the U-shape intrudes upon the first channel.

4. A battery pack retaining device in accordance with claim 1 wherein said first planar side has a plurality of contacts which exert a second predetermined force upon the battery pack, when said battery pack is fully inserted.

5. A battery pack retaining device in accordance with claim 4, wherein the first predetermined force is dependent upon the weight of the battery pack and upon the second predetermined force.

6. A battery pack retaining device in accordance with claim 4 wherein the first predetermined force exceeds the second predetermined force and the force created by the weight of the battery pack.

7. A battery pack retaining device in accordance with claim 1 wherein said guide bar has a predetermined height and width to create the first predetermined force.

8. A radiotelephone including a first housing having an electrical device disposed therein, a first set of electrical contacts partially disposed within the housing and having a first end and a second end, the first end of the first set of electrical contacts connected to the electrical device and the second end of the first set of electrical contacts projecting out of a rear side of the first housing and a battery pack retaining device formed integrally with the rear side of the housing for accepting a battery pack, the battery pack having a second set of electrical contacts, said battery pack retaining device comprising:

a first rail coupled to the first planar side and having at least a first channel formed therein along a first portion of the first rail, the first channel being perpendicular to the rear side of the housing;

a second rail coupled to the first planar side and aligned parallel to said first rail, the second rail having at least a second channel formed therein along a second portion of the second rail, the second channel also perpendicular to the rear side of the housing; and at least a first and a second compliance guide bar integrally coupled to the first portion of the first rail and the second portion of the second rail respectively, the at least first and second compliance guide bar having a shape such that upon full insertion of the battery pack the first and the second compliance guide bar is deflected away from the rear side of the housing by the battery pack and exerting a first predetermined force on the battery pack towards the first planar side and electrically coupling said first and second sets of electrical contacts.

9. A radiotelephone in accordance with claim 8 wherein the shape of the at least first and second compliance guide bars is a U-shape wherein the apex of the U-shape intrudes upon the first and the second channel.

10. A radiotelephone in accordance with claim 8, wherein the first predetermined force is dependent upon the weight of the battery pack and upon a second predetermined force created by the first set of electrical contacts.

11. A radiotelephone in accordance with claim 8 wherein the first predetermined force exceeds a second force created by the first set of electrical contacts and a force created by the weight of the battery pack.

12. A radiotelephone in accordance with claim 8 wherein said first and second compliance guide bars have a predetermined height and width to create the first predetermined force.

* * * * *